June 4, 1935. M. DWORK 2,003,502
JACKING ATTACHMENT
Original Filed Nov. 25, 1933
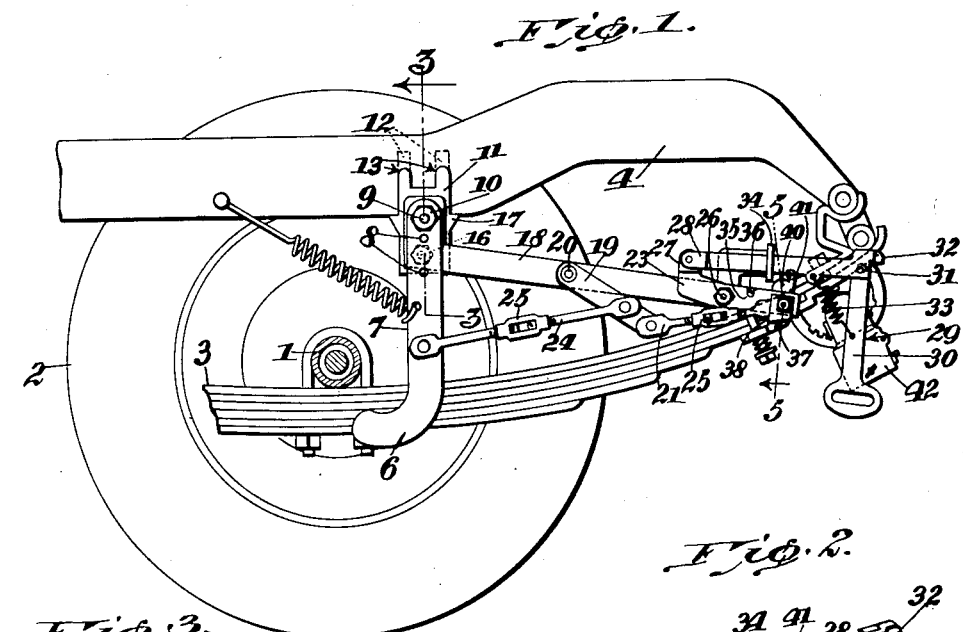
INVENTOR
*Max Dwork,*
BY
*Munn, Anderson & Liddy*
ATTORNEYS Patented June 4, 1935

2,003,502

UNITED STATES PATENT OFFICE 2,003,502

JACKING ATTACHMENT

Max Dwork, Brooklyn, N. Y.

Original application November 25, 1933, Serial No. 699,783. Divided and this application April 11, 1934, Serial No. 720,118

11 Claims. (Cl. 280—150)

This invention relates to improvements in jacking attachments in the class of land vehicles, attachments, and its objects are as follows:—

First, to provide a jacking attachment for land vehicles, for example automobiles, whereby the necessity of reaching in between the mud guard and frame to get a hold on the actuating handle bar is eliminated.

Second, to mount the linkage from the swinging hook on a stiff leg extending more or less directly from the chassis, instead of on the adjacent vehicle spring.

Third, to provide an improved bracket for the linkage, which bracket is adapted to be attached to the frame without having to extend any part of it over the top of the frame.

Fourth, to provide an improved lock for holding the linkage and hook in the retracted position.

In the drawing:—

Figure 1 is a cross section of the rear axle of an automobile, particularly showing the jacking attachment on the rear left side.

Figure 2 is a detail perspective view of a part of the linkage and the handle for actuating it.

Figure 3 is a cross section taken on the line 3—3 of Figure 1, particularly illustrating the improved bracket for the linkage and hook.

Figure 4 is a detail perspective view of the foregoing bracket.

Figure 5 is a detail cross section taken substantially on the line 5—5 of Figure 1, illustrating the improved lock for the linkage.

Figure 6 is a diagram showing how the hook may be operated from the front of the automobile.

This application is a division of an application for patent for Jacking attachment filed by Max Dwork November 25, 1933, Serial No. 699,783. The underlying purpose of the invention is to provide means for limiting the sag of the rear spring of an automobile when jacking up the chassis at a place other than beneath the axle. To this end it is an improvement on Patent No. 1,928,171 for Jacking attachment, granted to Max Dwork September 26, 1933.

Only a few parts disclosed herein are common to the patent, and those parts are the rear axle 1, right wheel 2, left rear spring 3, the portion 4 of the chassis and the hook 6. The shank 7 of the hook has a series of holes 8, a selected one of which receives the hook bolt 9 (Fig. 3). The hook is held on the bolt by a nut 10, which nut holds other parts with respect to a bracket 11. This bracket constitutes the first element of the improvement.

It has a pair of offset pins 12 (Fig. 4), which are inserted in holes 13 in the side of the chassis 4. This arrangement enables making the connection of the bracket with the chassis without having to extend any part of the bracket over the top of the frame or chassis as in the patent. Even when all else is assembled it is still possible to apply the attachment, particularly the bracket 11, the only prerequisite being the holes 13 into which the offset pins 12 are slipped. The bracket 11 has two holes 14, 15, the first being for the hook bolt 9, the second for a securing bolt 16 (Fig. 3). The bracket also has a shoulder 17 (Fig. 4) which is engageable with the underside of the chassis to make a firm connection.

A stiff leg 18 is mounted on the bolts 9, 16. This extends rearwardly from the bracket 11, and it does not turn. It comprises a mount for all of the linkage through which the hook 6 is actuated.

That linkage comprises a bar 19, pivoted at one end to the leg at 20. The opposite end of the bar has one end of a link 21 pivoted to it, the opposite end of this link being pivoted at 22 to a member 23. One end of a second link 24 is pivoted to the bar 19 near the pivotal point of the link 21, the opposite end of the second link being pivoted to the shank 7 of the hook. The links 21, 24 are of the adjustable type. They have turnbuckles 25 for the purpose.

The member 23 is medially pivoted at 26 to the stiff leg 18. The forward end of said member has an offset 27 (Fig. 2) to which the forward portion 28 of a two-part handle 29 is pivoted. The rear portion 30 of the handle is connected with the forward portion by a pivot pin 31. A stop 32 limits the portion 30 in two directions of movement, first when the portion 30 is extended rearwardly for the purpose of actuating the linkage, second when the portion 30 is released and permitted to assume the position in Figures 1 and 2. This is accomplished by gravity, but aided by a spring 33 which serves the additional purpose of preventing rattling between the two portions.

A loop 34 (Fig. 2) receives and guides the forward portion 28, but particularly prevents the handle 29 from swinging down on its pivotal connection to the offset 27 into a position which would be hard to reach. This loop is shown as a part of the stiff leg 18, and as such it may either be riveted on or be a part of the original stamping. It is also permissible to support the loop 34 from some point other than the stiff leg, although the latter serves the purpose well.

A notch and pin 35, 36 respectively on the member 23 and stiff leg 18, interengage when the linkage and hook are in the retracted position (Fig. 1). The pin extends out far enough beyond the member 23 to obstruct the link 21 and guard against the possibility of the link 21 turning upwardly on its pivot 22 an undesired extent.

For the purpose of holding the linkage and hook in the retracted position (Fig. 1) the stiff leg 18 carries a lock 37. This is in the form of a U of which one side is longer than the other (Fig. 5). The short side 38 provides a pocket which fits over the rear ends of the link 21 and member 23, keeping the pivot 22 from swinging downwardly, which would be necessary for the movement of the linkage and the hook to the axle-engaging position.

A set screw 39 (Fig. 5), carried by the long side 40 is turned until it binds against the leg 18, thereby to hold the lock 37 in the position in Figures 1 and 2. The long side 40 is provided with a lug 41 for the purpose of preventing the lock from turning down too far when the set screw is released. The tendency of the lock is to turn counter-clockwise when the set screw is released, and at such a time the lug 41 will engage the top of the stiff leg. A jack socket 42 is mounted on the substantial extremity of the spring 3 so as to be easily accessible to any ordinary type of jack, its details being disclosed in and confined to the parent application of which this is the division.

Figure 6 illustrates an arrangement by which the hook 6 can be operated from the front of the automobile, for example from the toe-board 68. A lever 69, or its equivalent, has a rack and dog arrangement commonly designated 70 for holding the lever and its connecting link 71 against the tension of the spring which normally tends to pull the hook toward the axle 1. Upon release of the dog the spring pulls the hook forwardly into the position to be engaged by the axle when the spring sags as brought out above.

The operation is readily understood. In viewing Figure 1 it is to be borne in mind that the left rear wheel is the one omitted, and that the jacking attachment shown in detail there is the mechanism to be brought into play for the purpose of raising the left wheel from the ground when the jack is applied. The two jacking attachments at the rear are identical.

The operator reaches under, backs off the set screw 39 (Fig. 5) of the lock 37 and swings the lock rearwardly clear of the pivot 22. The spring which is connected between the shank 7 and the chassis 4 then pulls forwardly on the shank until the hook 6 comes beneath the axle 1, at the same time turning the linkage in a generally clockwise direction and thrusting the handle 29 rearwardly into a position whereat it will not be necessary to reach between the mud guard and frame to get a hold on the actuating handle bar.

The head of the jack is now inserted in the socket 42 and the jack is worked as usual to elevate the chassis. The spring 3 will begin to sag due to the weight of the wheel and axle, but the axle will soon be caught by the hook 6 so as to limit the sag.

Upon operating the jack on a reverse order the chassis will be let down again. The operator now reaches down to take hold of the rear portion 30. The handle 29 is straightened by pulling up on said portion until its top edge engages the stop 32. This makes the handle rigid as far as a direct forward push is concerned, and upon so pushing on the handle the linkage is turned counter-clockwise, swinging the shank 7 rearwardly and causing the hook 6 to substantially clear the axle 1. The lock 37 is then re-engaged with the linkage at the pivot 22 and secured by the set screw 39. Upon release of the portion 30 the spring 33 will draw the latter down until its erstwhile forward end engages the stop 32.

It is to be observed that the linkage, namely the linkage for swinging the hook shank 7 in one direction, is all mounted on the stiff leg 18. This leaves the rear spring free for other purposes, in which respect the instant invention differs from the patent. The jack socket is now carried by the spring, and the arrangement illustrated makes it possible to impart the direct upward force of the jack to the chassis through the medium of the spring without reversely flexing the spring or the possibility of injuring it otherwise.

I claim:—

1. A jacking attachment comprising a hook and means for pivotally mounting it on a chassis, a bracket carried by the chassis with which the pivotal mounting is immediately made, linkage connected at one point with the hook for swinging the hook toward and from an axle, a stiff leg attached to the bracket, and means for connecting the linkage at other points to said stiff leg.

2. A jacking attachment comprising a hook and means for pivotally mounting it on a chassis, linkage comprising pivoted parts, being connected at one point with the hook for swinging the hook toward and from an axle, a stiff leg carried by the chassis, means for connecting the linkage at other points to the stiff leg, and a lock carried by the stiff leg to engage a part of the linkage and hold the hook in a retracted position with respect to the axle.

3. A jacking attachment comprising a hook, means for pivotally mounting it on a chassis, said means including a bracket having offset pins by which it is attached to the chassis, linkage comprising pivoted parts, being connected at one point with the hook, a stiff leg carried by the bracket, means for connecting the linkage at other points to the stiff leg, locking means carried by the stiff leg to engage at least one part of the linkage for holding the hook retracted, and a two-part handle attached to one part of the linkage, said handle being extensible for operation of the link, and said stiff leg having a loop for guiding one portion of the two-part handle.

4. In a jacking attachment including a pivoted hook, operating linkage for swinging the hook, said linkage including a member with a notch, a stiff leg and means by which the member is pivoted to the stiff leg, and a pin carried by the stiff leg occupying the notch in one position of the linkage, said pin extending beyond said member into the path of an adjacent part of the linkage.

5. In a jacking attachment including a pivoted hook, a spring normally tending to draw the hook toward the axle of a vehicle, means for normally resisting the tendency of the spring and for keeping the hook disengaged from the axle, said means including a lever and means by which it is pivoted at the front of the vehicle, a rack and dog arrangement for holding the lever, and a link connecting the lever with the hook.

6. A jacking attachment comprising a hook, means including a bracket having at least one integral offset pin insertible in a hole in a chassis, means for pivotally mounting the hook on said bracket, said chassis having a spring supported axle, linkage connected at one point with the hook for swinging the hook with respect to the axle, and means by which the linkage is connected at another point to the chassis.

7. A jacking attachment comprising a pivotal hook, linkage connected at one end with the hook for swinging the hook toward and from an axle, a stiff leg to which the linkage is connected at another point, and means which is the common mount for the stiff leg and hook pivot on a chassis.

8. A jacking attachment comprising a swinging hook and linkage connected at one point with the hook for swinging it, a stiff leg to which the linkage is connected at another point, a bracket to which the hook and leg are commonly mounted, and means aiding in securing the bracket to a chassis, said means constituting the pivot on which the hook is swung and part of means by which the stiff leg is secured.

9. A jacking attachment comprising a swinging hook and linkage connected at one point with the hook for swinging it, a stiff leg to which the linkage is connected at another point, a bracket and means by which the stiff leg is secured to the bracket at one place, and a hook bolt comprising part of means by which the bracket is secured to a chassis, said bolt constituting a pivot on which the hook is swung as well as a second place at which the stiff leg is secured.

10. A jacking attachment comprising a swinging hook and linkage connected with the hook at one point for swinging it, a stiff leg to which the linkage is connected at another point, a bracket providing the common mount for the hook and stiff leg, and means for securing the bracket to a chassis, said means including at least one offset pin insertible in a hole in the chassis.

11. A jacking attachment comprising a swinging hook and linkage connected with the hook at one point for swinging it, a stiff leg to which the linkage is connected at another point, a bracket providing the common mount for the hook and stiff leg, means for securing the bracket to a chassis, said means including at least one offset pin insertible in a hole in the chassis, and a shoulder on the bracket held up against the chassis when said pin is inserted in the hole.

MAX DWORK.